(12) United States Patent
Baird

(10) Patent No.: US 8,459,662 B2
(45) Date of Patent: Jun. 11, 2013

(54) MOWING APPARATUS

(76) Inventor: Jeffery D. Baird, Ada, OK (US)

( * ) Notice: Subject to any disclaimer, the term of this patent is extended or adjusted under 35 U.S.C. 154(b) by 126 days.

(21) Appl. No.: 13/208,068

(22) Filed: Aug. 11, 2011

(65) Prior Publication Data

US 2012/0047862 A1 Mar. 1, 2012

Related U.S. Application Data

(60) Provisional application No. 61/372,757, filed on Aug. 11, 2010.

(51) Int. Cl.
*B62D 49/08* (2006.01)

(52) U.S. Cl.
USPC .............. 280/6.154; 280/5.513; 280/755; 56/14.7

(58) Field of Classification Search
USPC ............... 280/755, 758, 6.15, 6.154, 6.155, 280/5.501, 5.513; 56/14.7
See application file for complete search history.

(56) References Cited

U.S. PATENT DOCUMENTS

| | | | | |
|---|---|---|---|---|
| 4,707,971 A * | 11/1987 | Forpahl et al. | | 56/6 |
| 5,615,748 A * | 4/1997 | Lansberry | | 180/9.36 |
| 5,857,535 A * | 1/1999 | Brooks | | 180/41 |
| 6,327,839 B1 * | 12/2001 | Velke et al. | | 56/14.7 |
| 6,516,596 B2 * | 2/2003 | Velke et al. | | 56/14.7 |
| 7,468,592 B2 * | 12/2008 | Lim et al. | | 318/568.12 |
| 7,527,117 B2 * | 5/2009 | Strong | | 180/209 |
| 7,784,570 B2 * | 8/2010 | Couture et al. | | 180/9.1 |
| 8,275,516 B2 * | 9/2012 | Murphy | | 701/38 |
| 2005/0087378 A1 * | 4/2005 | Hrazdera | | 180/170 |
| 2006/0254840 A1 * | 11/2006 | Strong | | 180/190 |

* cited by examiner

*Primary Examiner* — Joseph Rocca
*Assistant Examiner* — Timothy Wilhelm
(74) *Attorney, Agent, or Firm* — Dunlap Codding, P.C.

(57) ABSTRACT

A mowing apparatus having a center of gravity having a frame member, at least one front ground engaging wheel rotatably connected proximate the front end of the frame member and at least two rear ground engaging wheels rotatably connected proximate the back end of the frame member so as to substantially prevent the mowing apparatus from rolling over as it traverses along an inclined surface.

9 Claims, 4 Drawing Sheets

MOWING APPARATUS

CROSS REFERENCE TO RELATED APPLICATION

This application claims benefit to U.S. Provisional Application No. 61/372,757, filed Aug. 11, 2010, the entire contents of which are hereby incorporated herein by reference.

BACKGROUND OF THE INVENTION

1. Field of the Invention

This invention relates to a self-propelled mowing apparatus, and more particularly, but not by way of limitation, to a self-propelled mowing apparatus for use on an inclined surface.

2. Brief Description of Related Art

Mowing apparatuses are well known in the art. Generally, mowing apparatuses include a frame which houses a cutting apparatus (e.g., rotary cutting blades, reciprocating teeth, and the like). The frame also typically includes ground engaging wheels or tracks for translation of the mowing apparatus along the ground. An example of one such device is a brush-hog used in commercial applications which is pulled and/or pushed by another machine such as a tractor.

In most cases, mowing surfaces having a slope ranging from 0° to 30° are generally considered safe for a commercial mowing apparatus. In contrast, mowing inclines surfaces, for example, surfaces having a slope greater than 30° can be inherently dangerous due to the proclivity of the mowing apparatus to rolling over. An object may roll over if it has a high center of gravity relative to the width of the object. The stability of a vehicle is a function of its design, and many experts use the formula T/2H to define a stability ratio, where T=vehicle track and H=Vehicle Center of Gravity height. Thus, it is clear that the taller the vehicle relative to the width of the vehicle, the greater chance of a rollover event.

Generally, tractors used to push and/or pull a mowing apparatus will have a relatively high center of gravity relative to its track width which may cause the tractor and the mowing apparatus to roll over if used on a hill with a slope in excess of 30°. Therefore, a need exists for a self-propelled mowing apparatus having the center of rotation of at least one wheel positioned above the center of gravity of the mowing apparatus such that the mowing apparatus may be used on inclined surfaces, including surfaces having a slope greater than 30°. Furthermore, the need exists for a self-propelled mowing apparatus which is remotely controlled such that an operator may utilize the mowing apparatus at a safe distance. It is to such an apparatus that the present invention is directed.

DETAILED DESCRIPTION OF EXEMPLARY EMBODIMENT

Figure 1:
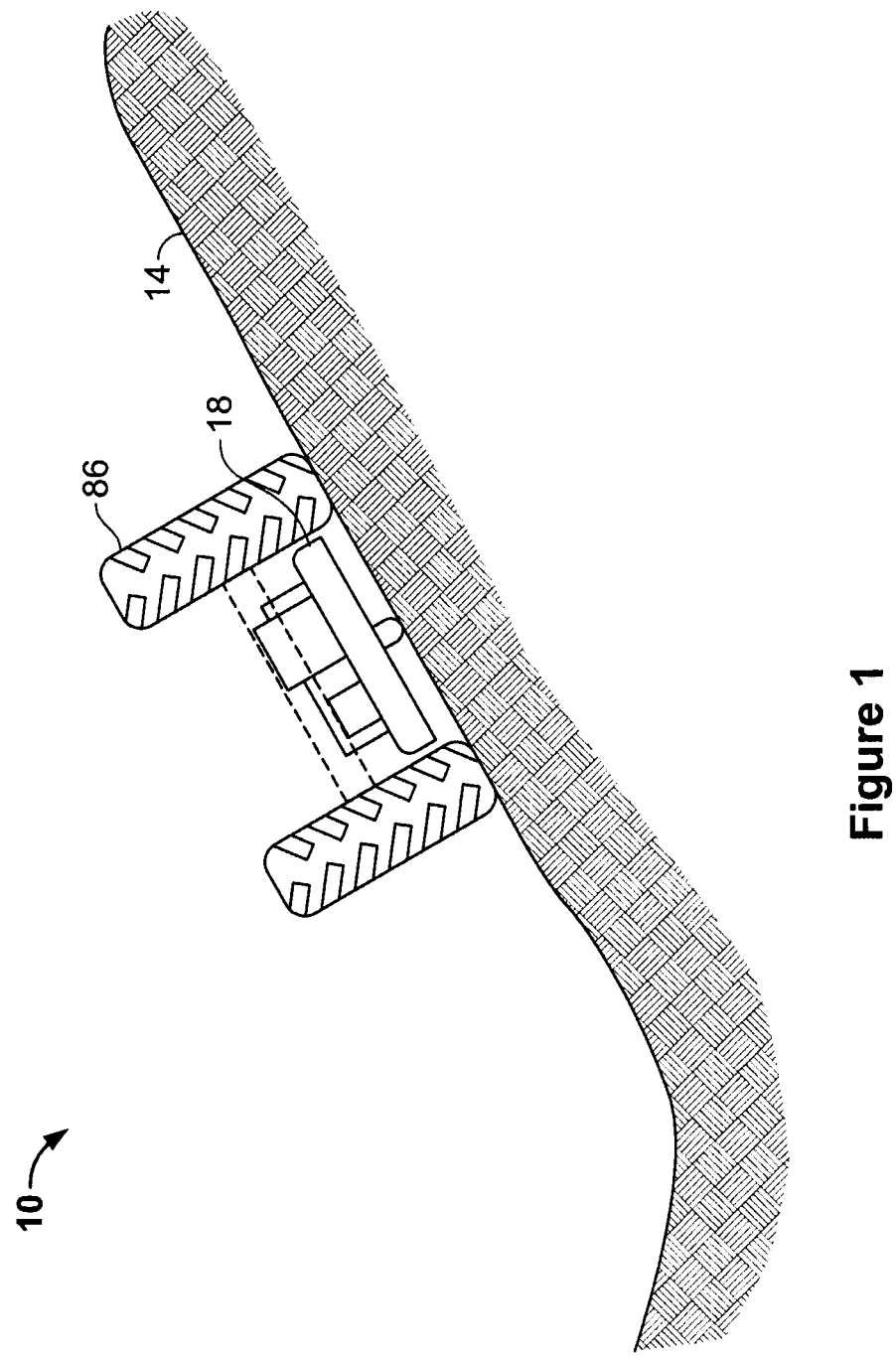
FIG. 1 is a partial, rear elevational view of a self-propelled mowing apparatus constructed in accordance with the presently disclosed inventive concepts shown operating on an inclined surface.
Figure 2:
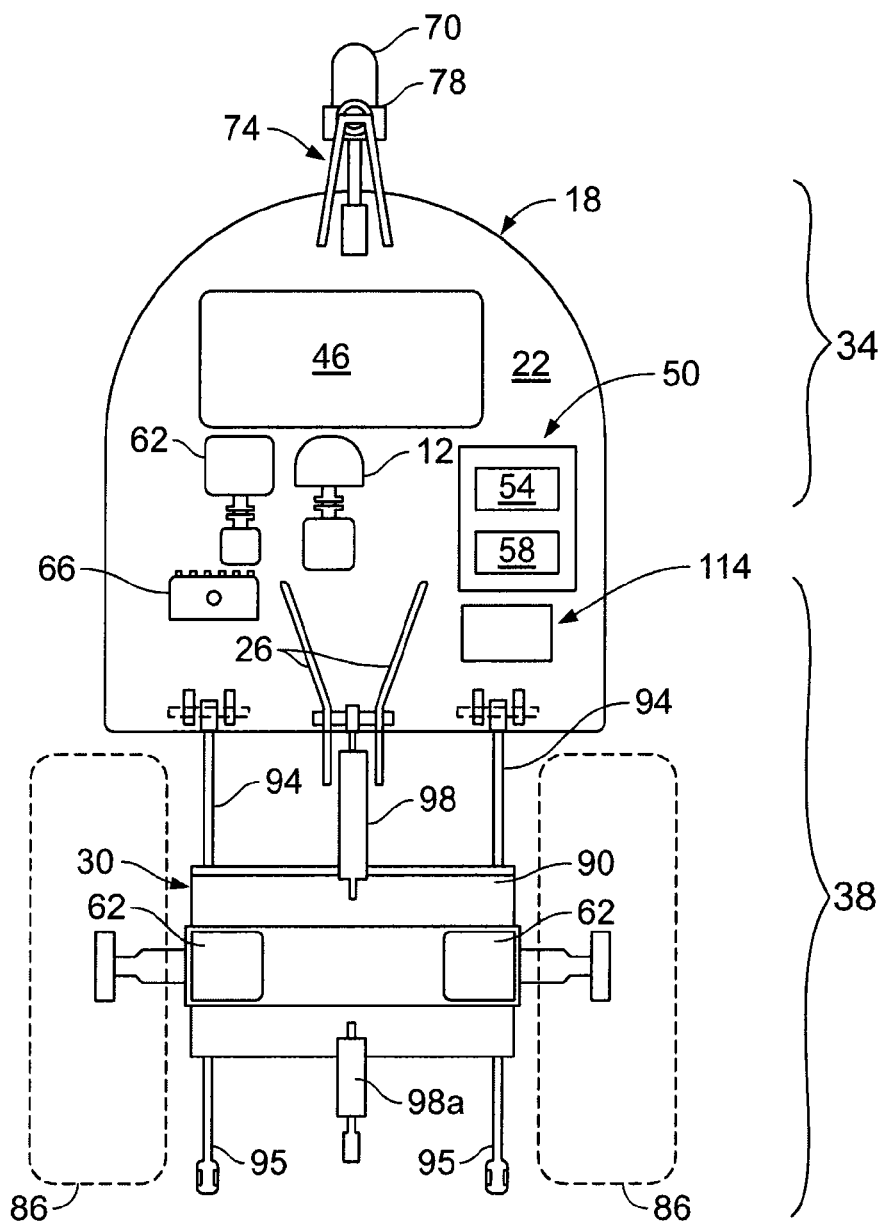
FIG. 2 is a top plan view of the self-propelled mowing apparatus of FIG. 1.
Figure 3:
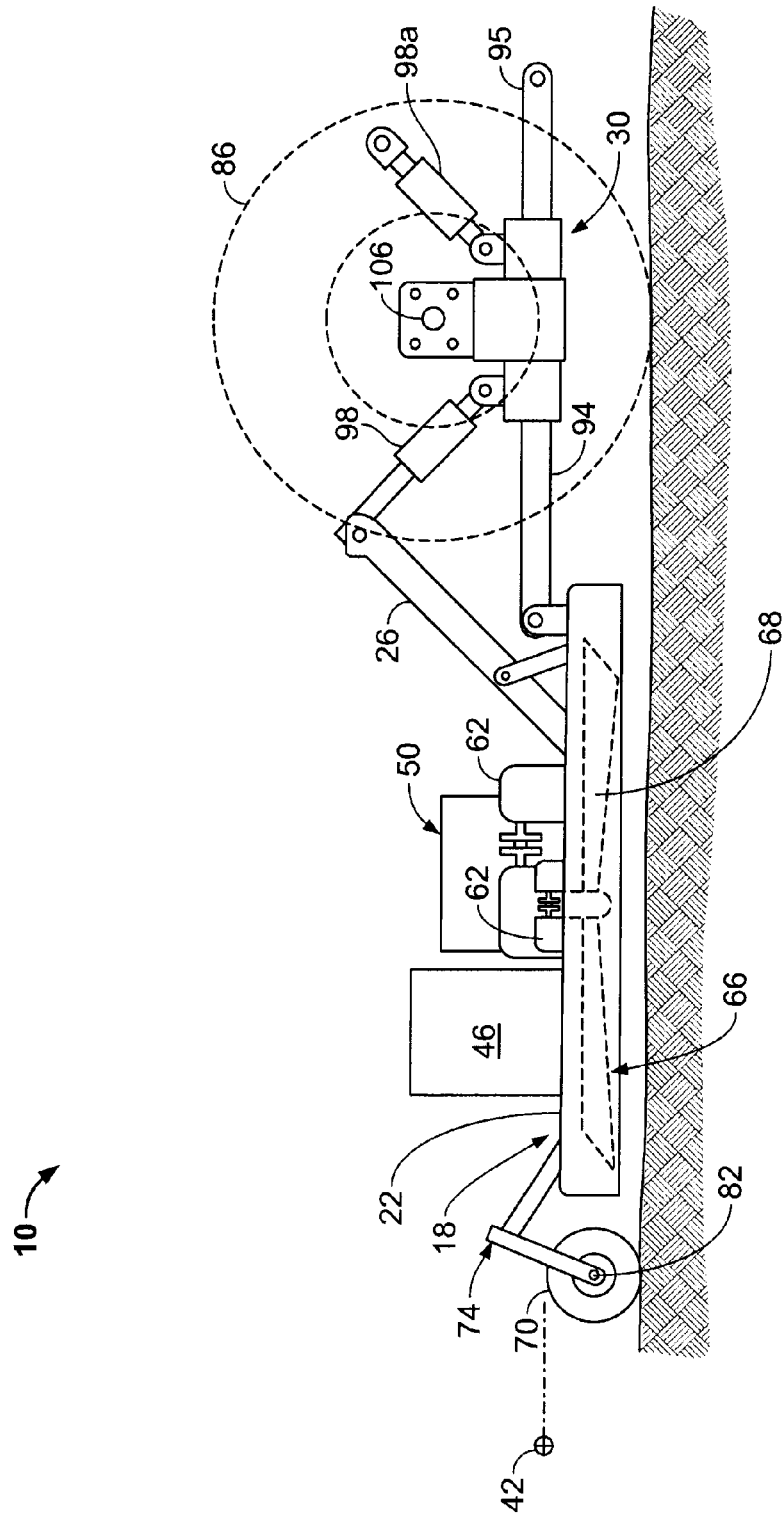
FIG. 3 is a side elevational view of the self-propelled mowing apparatus of FIGS. 1 and 2.

Referring now to the drawings and, more particularly to FIGS. 1-3 collectively, shown therein is a self-propelled mowing apparatus 10 operating on an inclined surface 14 (FIG. 1), in accordance with the present invention. The mowing apparatus 10 is provided with a frame member 18. The frame member 18 of the mowing apparatus 10 may be constructed of any one of a number of strong and rigid materials, for example, a resin of plastic polymer, natural material(s) such as a wood or fiber based material, metal (such as steel, titanium, aluminum or blends thereof), fiber or glass based materials and combinations thereof. The shape and size of the frame member 10 may vary according to design requirements and will typically depend upon the size, number and positioning of contents that the frame member 18 will support, for example, engine, wheels, control mechanism, and the like. In one embodiment, the frame member 18 is provided with a base plate 22 for supporting contents and vertical support members 26 extending from the base plate 22 for interfacing with a wheel support platform 30, as will be discussed in greater detail below. It will be understood that despite the shape, size or construction of the frame member 18 and/or the wheel support platform 30, the mowing apparatus 10 includes a front end 34, a back end 38 and a center of gravity 42 (denoted by the plan marker) which may be positioned at some distance from the ground. It will be further understood that as the height and width of the mowing apparatus 10 change due in response to design requirements, the center of gravity 42 of the mowing apparatus 10 will change.

The mowing apparatus 10 may also include contents, for example, an engine 46. By way of non-limiting example, the engine 46 may include an internal combustion engine, an electric motor, or other motive mechanism and/or combinations thereof. The engine 46 is supported by the base plate 22 of the frame member 18 and provides motive forces to power various parts of the mowing apparatus 10. For example, the mowing apparatus 10 may include a hydraulic sub-assembly 50 which includes a hydraulic pump 54 that is operatively connected to a hydraulic reservoir 58 and one or more hydraulic motors 62. The hydraulic sub-assembly 50 may also include a hydraulic line terminal 66 that operates to control the hydraulic fluid communicated from the hydraulic reservoir 58 to the hydraulic motors 62. The hydraulic pump 54 is powered by the engine 46 and provides fluid communication to the hydraulic motors 62 via hydraulic hoses (not shown). The hydraulic motors 50 are operatively connected to various parts of the mowing apparatus 10, for example, a cutting mechanism 66.

In one embodiment, the cutting mechanism 66 includes a rotary blade 68 which is rotatably connected to one of the engine 46 and/or a hydraulic motor 62. It will be understood that other types of cutting mechanisms, for example, reciprocating teeth and rotating sickle bars, that would be known to one of ordinary skill in the art with the present disclosure before them, are likewise contemplated for use in accordance with the present invention.

The mowing apparatus 10 is provided with at least one front ground engaging wheel 70 rotatably connected proximate the front end 34 of the frame member 18. The front ground engaging wheel 70 is rotatably connected to and powered by the engine 46. In one embodiment, the front ground engaging wheel 70 is connected to the front end 34 of the frame member 18 via an armature 74. The armature 74 suspends the front ground engaging wheel 70 out at a distance away from the front end 34 of the frame member 18. Furthermore, the front ground engaging wheel 70 may be rotatable about a hinge point 78 of the armature 74 of the frame member 18. The rotation of the front ground engaging wheel 70 allows for the front ground engaging wheel 70 to be angled relative to the frame member 18 to cause the mowing apparatus 10 to turn. The front ground engaging wheel 70 may be rotatably connected to the armature 74 via an axle, for example. Additionally, the at least one front ground engaging wheel 70 includes a center axis of rotation 82. In one embodiment (although not shown), the center axis of rotation 82 of the at least one front ground engaging wheel 70 is positioned above the center of gravity 42 of the mowing apparatus 10 to substantially preclude the mowing apparatus 10 from rolling over as it traverses along an inclined surface.

Also, the mowing apparatus 10 may include at least two rear ground engaging wheels 86 rotatably connected proximate the back end 38 of the mowing apparatus 10. Each of the at least two rear ground engaging wheels 86 is disposed on the wheel support platform 30 connected to the frame member 18. The wheel support platform 30 is provided with base frame 90, connecting arms 94, connecting arms 95, and one or more cylinders 98.

The mowing apparatus 10 may further include one or more rear support wheels (not shown) connected to the back end 38 for supporting the back 38 of the frame member 18 independently of the rear ground engaging wheels 86.

The base frame 90 of the wheel support platform 30 can be constructed of any one of a number of strong and rigid materials, for example, a resin or plastic polymer, natural material (s) such as a wood or fiber based material, metal (such as steel, titanium, aluminum or blends thereof), fiber or glass based materials and combinations thereof. The shape and size of the base frame 90 may vary according to design requirements and may typically depend upon the size and positioning of the rear ground engaging wheels 86, the stabilizer arms 94 and the like. The base frame 90 is pivotally connected to the vertical support member 26 of the frame member 18 via the cylinder 98 and the connecting arms 94. The cylinders 98 allow the wheel support platform 30 to pivot relative to the frame member 18 to raise/lower the cutting mechanism 66 relative to the ground. The cylinders 98 also operate to dampen vibrational forces transmitted to the mowing apparatus 10 as it traverses along the ground. Furthermore, the cylinders 98 may be operatively connected to the hydraulic pump 54 of the hydraulic sub-assembly 50 such that the length of the cylinders 98 may be automatically varied to ensure that the center of rotation of the at least two rear ground engaging wheels 86 remains above the center of gravity 42 of the mowing apparatus 10. Additionally, each of the at least two ground engaging wheels 86 are connected to the wheel support platform 30 via hydraulic motors 62 mounted onto the base frame 90 of the wheel support platform 30. The connecting arms 95 and the cylinder 98a provide a point of attachment for other implements, such as a box blade or post hole digger.

The ground engaging wheels 86 are connected to the hydraulic motors 62 such that their center axes of rotation 106 are positioned above the center of gravity 42 of the mowing apparatus 10 to substantially prevent the mowing apparatus 10 from rolling over as it traverses along the inclined surface 14. Although not shown, the two rear ground engaging wheels 86 may alternatively be operatively connected to the engine 46 in such a way that rear ground engaging wheels 86 are rotated by operation of the engine 46.

In one embodiment, the rotation of the rear ground engaging wheels 86 may be independently controlled such that the mowing apparatus 10 may be directionally controlled via the rotation of the rear ground engaging wheels 86. For example, when the right rear ground engaging wheel 86 is rotating clockwise and the left rear ground engaging wheel 86 is not rotating, the mowing apparatus 10 will turn in the clockwise direction and vice versa. Additionally, when the rear ground engaging wheels 86 are rotated in opposite directions simultaneously, the mowing apparatus 10 will pivot about a specified point to change direction.

Although the rear ground engaging wheels 86 have been disclosed as connectable to the engine 46 and/or hydraulic motors 62, the front ground engaging wheel 70 may also be operatively connected to the engine 46 and/or a hydraulic motor as well. Additionally, in another embodiment, only the front ground engaging wheel 70 may be operatively connected to the engine 46.

Figure 4:
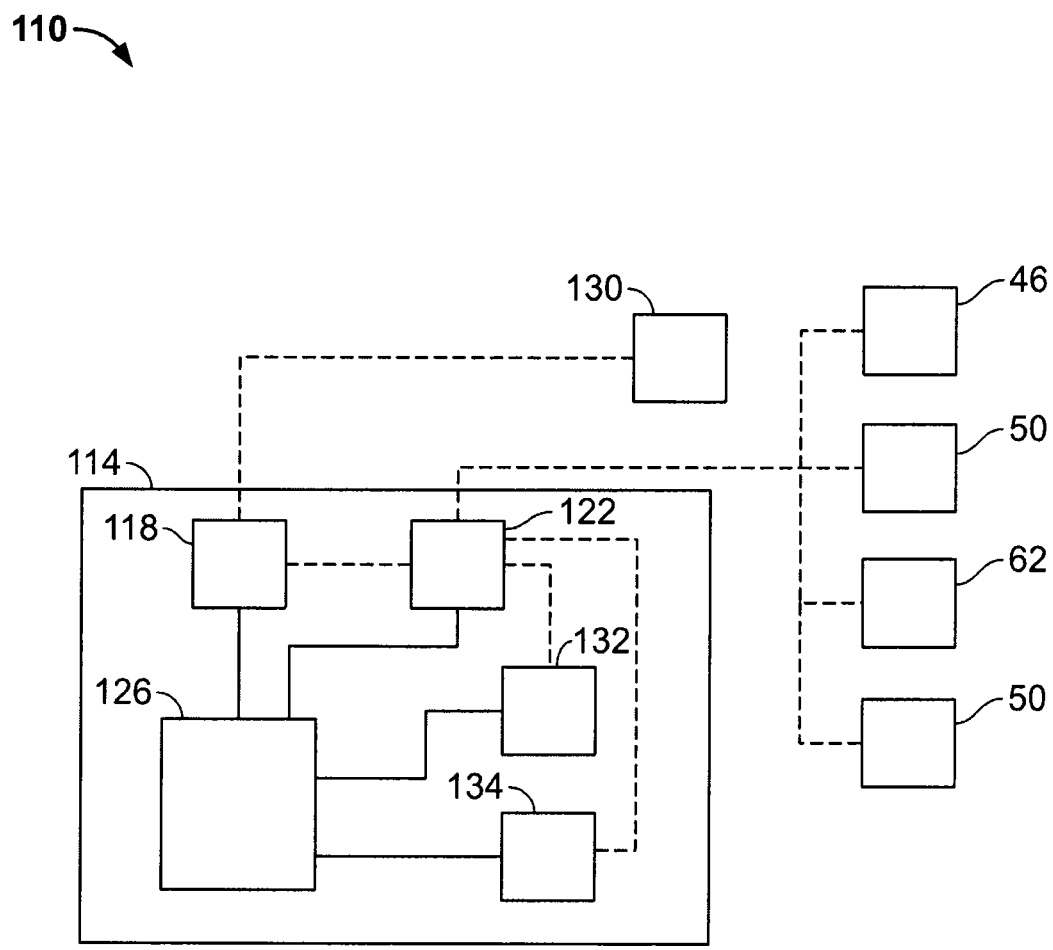
FIG. 4 is a schematic diagram of a remote control system comprising a control circuit.

Referring now to FIG. 4, as the mowing apparatus 10 may be used for potentially dangerous applications (e.g., operation on inclined surface having a slope greater than 30°) the mowing apparatus 10 may include a remote control system 110 which allows the mowing apparatus 10 to be operated at a safe distance. The remote control system 110 may include a mower control system 114 which includes a receiver 118, a control circuit 122 and an energy storage device 126 which provides electrical energy to power the various parts of the mower control system 114. Examples of energy storage devices 126 include, but are not limited to, primary and secondary electrochemical cells. Also, the remote control system 110 includes a remote control 130 for remotely operating various parts of the mowing apparatus 10.

The receiver 118 receives electrical signals from the remote control 130 and outputs signals to the control circuit 122. It will be understood that the receiver 118 may include a transceiver or a multiple wireless transceiver unit capable of communication with multiple wireless devices. The receiver 118 may include any number of devices which receive and/or transmit electrical signals via a low power radio frequency. The control circuit 122, in turn, outputs electrical signals to mechanical actuators (not shown) or other devices for controlling various mechanical parts of the mowing apparatus 10. The mechanical actuators (not shown) receive electrical signals from the control circuit 122 and in response to the received signals, alter the operation of various mechanical parts of the mowing apparatus 10, for example, controlling the speed of the engine 46 by engaging or disengaging the throttle of the engine 46, controlling the engagement or disengagement of the cutting mechanism 66 by engaging or disengaging the connection between the cutting mechanism 66 and the hydraulic motor 62 and/or the engine 46, controlling the angle of the at least one front ground engaging wheel 70, and/or controlling the speed of rotation of the at least two ground engaging wheels 86 by varying the rotation of the hydraulic motor 62.

The mowing apparatus 10 may include a sensor 132 that continuously monitors the center of gravity 42 of the mowing apparatus 10. The sensor 132 communicates with the control circuit 122 which operates to control the hydraulic sub-assembly 50 which in turn regulates the length of the cylinders 98 of the wheel support frame 30 to ensure that the center aces of rotation 106 of the at least two rear ground engaging wheels 86 are substantially above the center of gravity 42 of the mowing apparatus 10. Non-limiting examples of sensors which measure the center of gravity of a machine are provided in U.S. Pat. No. 4,935,885, issued to McHale et al. and U.S. Pat. No. 6,353,793, issued to Godwin et al.

The mowing apparatus 10 may also optionally include a slope sensor 134 configured to measure the slope of the inclined surface that the mowing apparatus 10 is operating along. The slope sensor 124 may output a warning signal when the slope of the inclined surface is between 40° and 50°. The warning signal is communicated to the remote control 130 where it is output as an audible or visual warning on the remote control 130 to warn the operator that the mowing apparatus 10 is operating on a potentially dangerous inclined surface. In cases where the slope of the inclined surface exceeds 50°, the slope sensor 134 may communicate a signal to the receiver 118 which, in turn, communicates a signal to the control circuit 122 that communicates a signal to the engine 46 of the mowing apparatus 10 causing it to stop. Although such a signal from the slope sensor 134 has been disclosed as being communicated when the slope of the inclined surface is greater than 50°, the slope sensor 134 may be programmed to communicate the stop signal at slopes of less than 50°.

The mowing apparatus 10 may include additional sensors that enhance safe operation of the mowing apparatus 10. For example, the mowing apparatus 10 may include a sensor (not shown) for stopping power if the mowing apparatus 10 travels a predetermined distance away from the operator. Likewise, the mowing apparatus 10 may include a sensor (not shown) to sop power if the mowing apparatus travels within a predetermined distance of the operator or should an object come between the mowing apparatus 10 and the operator.

From the above description, it is clear that the present invention is well adapted to carry out the objects and to attain the advantages mentioned herein as well as those inherent in the invention. While presently preferred embodiments of the invention have been described for the purposes of this disclosure, it will be understood that numerous changes may be made which will readily suggest themselves to those skilled in the art and which are accomplished within the spirit of the invention discloses and as defined in the appended claims.

What is claimed is:

1. A mowing apparatus having a center of gravity, the mowing apparatus comprising:
    a frame member having a front end and a back end;
    at least one front ground engaging wheel rotatably connected proximate the front end of the frame member;
    at least two rear ground engaging wheels rotatably connected proximate the back end of the frame member, each of the at least two rear ground engaging wheels having a center axis of rotation; and
    means for continuously monitoring the center of gravity of the mowing apparatus,
    wherein the at least two rear ground engaging wheels being selectively positionable based upon data gathered by the means for continuously monitoring a center of gravity of the mowing apparatus such that the center axes of rotation of the at least two rear ground engaging wheels are positioned above the center of gravity of the mowing apparatus in such a way that the mowing apparatus is substantially prevented from rolling over as it traverses along an inclined surface.

2. The apparatus of claim 1, wherein the at least one front ground engaging wheel comprises a center axis of rotation and the center axis of rotation is positioned at a predetermined distance above the center of gravity of the mowing apparatus.

3. The apparatus of claim 2, wherein the center axis of rotation of the at least two rear ground engaging wheels is positioned above the center axis of rotation of the at least one front ground engaging wheel.

4. The apparatus of claim 1, wherein the mowing apparatus is operable via a remote control system.

5. The apparatus of claim 4, wherein the remote control system further comprises a receiver in electrical communication with mechanical actuators connected to the at least one ground engaging wheel and each of the at least two ground engaging wheels, the receiver receiving electrical signals from a remote control and outputting electrical signals to the mechanical actuators for controlling at least one of:
    a speed of rotation of each of the at least two rear ground engaging wheels; and
    an angle of the at least one front ground engaging wheel relative to the frame member for controlling a path of direction of the mowing apparatus.

6. The apparatus of claim 1, further comprising a slope sensor measuring the slope of the inclined surface, the slope sensor outputting a warning signal to the remote control when the slope of the inclined surface is between 40° and 50°, wherein the remote control receives warning signals communicated from the slope sensor outputs one of an audible and visual warning.

7. The apparatus of claim 6, wherein when the slope measures a slope of greater than 50°, the slope sensor outputs a stop signal to the receiver of the mowing apparatus that causes the engine of the mowing apparatus to stop.

8. The apparatus of claim 1, wherein each of the at least two rear ground engaging wheels may be operated at different rates of rotation to change a path of direction of the mowing apparatus.

9. A mowing apparatus having a center of gravity, the mowing apparatus comprising:
    a sensor continuously monitoring the center of gravity of the mowing apparatus;
    a frame member having a front end and a back end;
    at least one front ground engaging wheel rotatably connected proximate the front end of the frame member;
    at least two rear ground engaging wheels rotatably connected proximate the back end of the frame member, each of the at least two rear ground engaging wheels having a center axis of rotation, the at least two rear ground engaging wheels being selectively positionable based upon data gathered from the sensor such that the center axes of rotation of the at least two rear ground engaging wheels are positioned above the center of gravity of the mowing apparatus in such a way that the mowing apparatus is substantially prevented from rolling over as it traverses along an inclined surface; and
    wherein the at least one front ground engaging wheel may be selectively angled relative the frame member to control a direction of movement of the mowing apparatus.

* * * * *